E. JAENISCH.
CONSTRUCTION OF THE CYLINDERS AND ACCESSORY PARTS OF INTERNAL COMBUSTION ENGINES.
APPLICATION FILED OCT. 11, 1911.
1,087,539.
Patented Feb. 17, 1914.
3 SHEETS—SHEET 1.
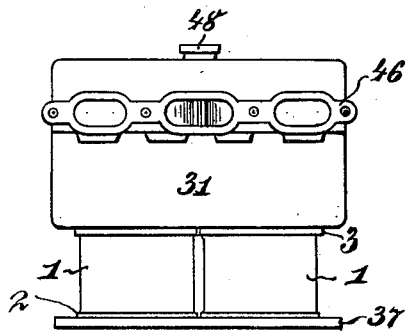
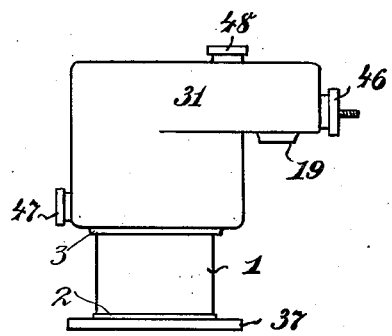
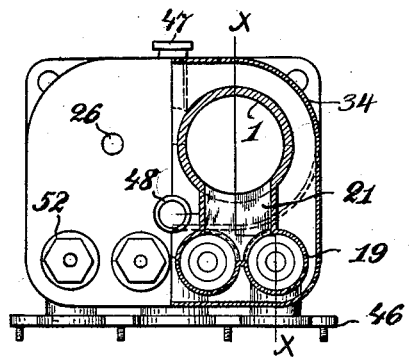
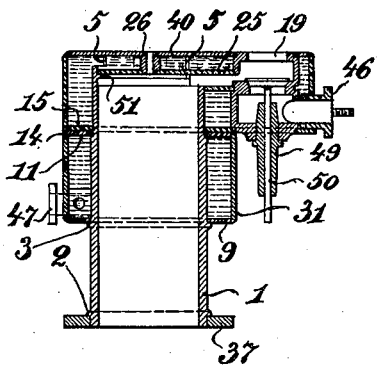
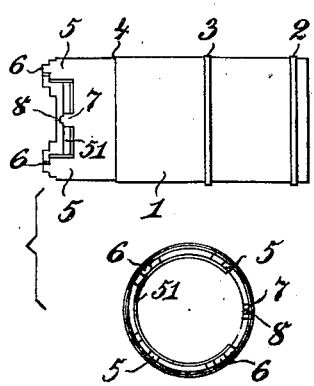
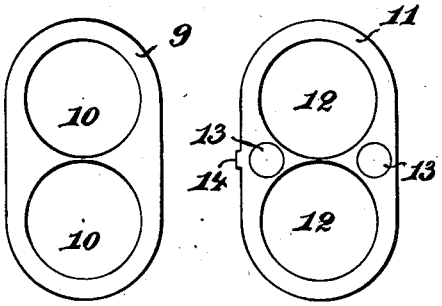

E. JAENISCH.
CONSTRUCTION OF THE CYLINDERS AND ACCESSORY PARTS OF INTERNAL COMBUSTION ENGINES.
APPLICATION FILED OCT. 11, 1911.
1,087,539.
Patented Feb. 17, 1914.
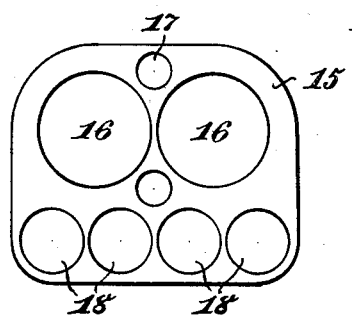
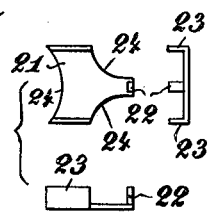
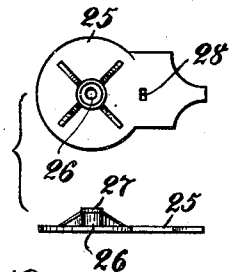
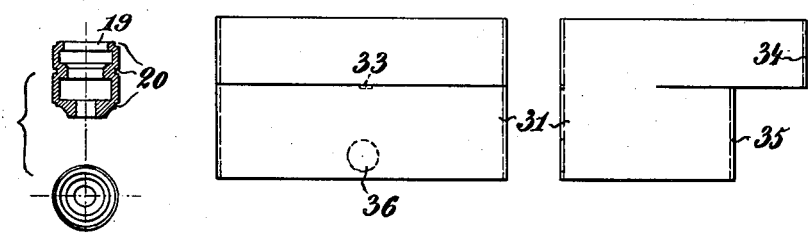
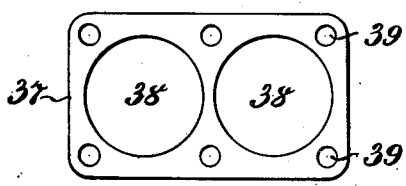
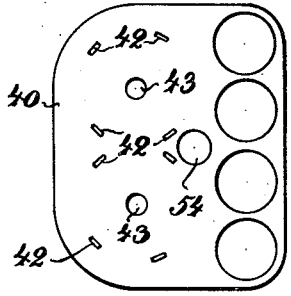
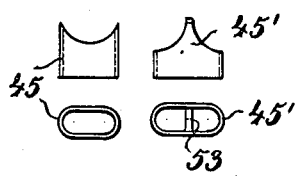

E. JAENISCH.
CONSTRUCTION OF THE CYLINDERS AND ACCESSORY PARTS OF INTERNAL COMBUSTION ENGINES.
APPLICATION FILED OCT. 11, 1911.
1,087,539.
Patented Feb. 17, 1914.
3 SHEETS—SHEET 3.
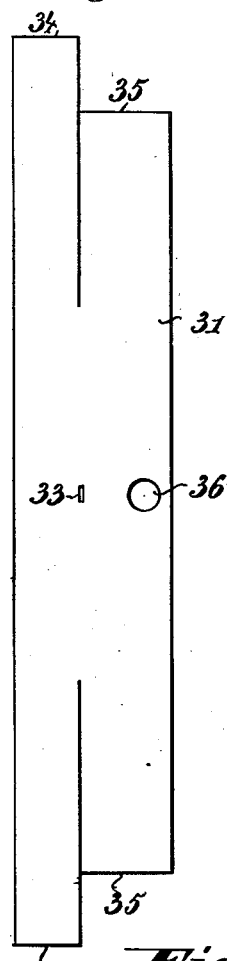
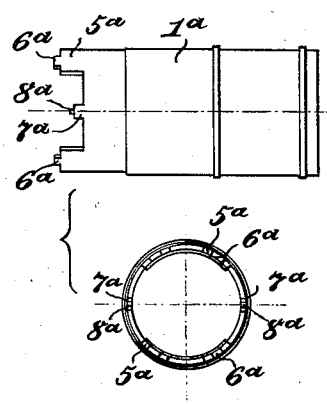
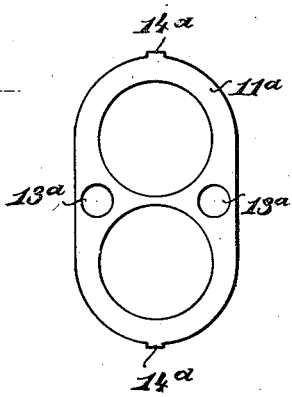
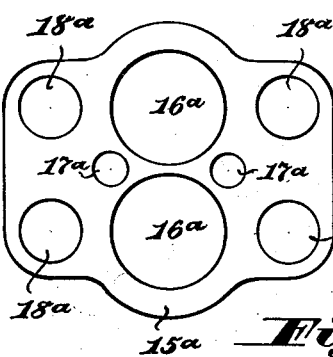
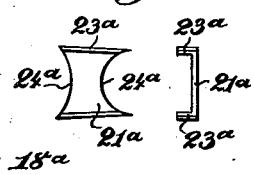
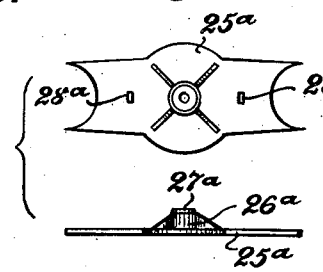
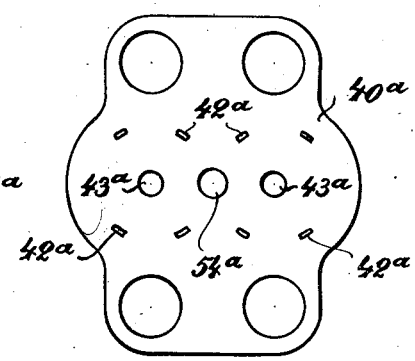

UNITED STATES PATENT OFFICE.

ERNST JAENISCH, OF CHARLOTTENBURG, GERMANY.

CONSTRUCTION OF THE CYLINDERS AND ACCESSORY PARTS OF INTERNAL-COMBUSTION ENGINES.

1,087,539. Specification of Letters Patent. Patented Feb. 17, 1914.

Application filed October 11, 1911. Serial No. 654,057.

*To all whom it may concern:*

Be it known that I, ERNST JAENISCH, of 9 Wielandstrasse, Charlottenburg, near Berlin, German Empire, a subject of the King of Prussia, and whose post-office address is 9 Wielandstrasse, Charlottenburg, near Berlin, Kingdom of Prussia, German Empire, have invented new and useful Improvements in or Relating to the Construction of the Cylinders and Accessory Parts of Internal-Combustion Engines, of which the following is a specification.

The invention relates to the construction of cylinders and accessory parts of explosion motors or internal combustion engines and consists in one two or more cylinders being connected to their valve-boxes and to the cooling jacket by autogenous welding the valve boxes being turned bodies and the cylinder or cylinders on a level with the bottom edge of the valve-boxes having two welded sustaining ribs which divide the cooling jacket into a bottom part, which merely surrounds the cylinder or cylinders, and a top part which surrounds the cylinder-head and the valve-boxes, so that this top part of the cooling jackets contains the connecting channels, which are connected by autogenous welding to the valve-boxes, and the corresponding cylinder, and the inlet and outlet connecting branches of the valve-boxes, which are in like manner connected to the valve-boxes and cooling jacket box.

The drawing represents as an example, a construction with two cylinders.

Figure 1 is a side view, Fig. 2 is a view from above showing the one cylinder and the two corresponding valve-boxes in section. Fig. 3 is a front elevation, and Fig. 4 a longitudinal section through one cylinder and one valve-box. Figs. 5 to 17 are individual representations of the cylinder parts according to Figs. 1 to 4. Figs. 18 to 23 are representations of the individual parts of a construction in which the arrangement of the valve chambers is altered with regard to the two cylinders.

In the construction shown in Figs. 1 to 17 all the four valve chests are arranged on one side of the two cylinders. The cylinders are shaped as shown in Fig. 5. Each cylinder 1 is turned not only in its interior, but also on its exterior and is provided with ribs 2 and 3 and a shoulder 4. On the front edge four projections 5 are provided which in their turn, are formed with end-pins or lugs 6. In addition, at the part adjacent to the valve-chests a shorter projection 7 with end-lug 8 is provided. This lug 8 has its commencement on a level with the cover of the connecting channel from the interior of the cylinder to the valve-chests, while the lugs 6 are on a level with the covering plate of the cooling jacket. The two cylinders 1, shaped in this manner are connected to a lower bottom-plate 9, by their central parts being passed through openings 10 in the plate 9, the plate 9 engaging against the ribs 3 and being there welded to the cylinders. This plate 9 forms the bottom of the cooling jacket (Fig. 4). Then the under sustaining rib or ring 11 (Fig. 7) is connected in like manner to the cylinders 1, the openings 12 being pushed over the top part of the cylinders and the rings and cylinders being welded together at 4. This lower sustaining ring 11 is provided on the side remote from the valve-box with a projection 14 (Figs. 4 and 7) and, in addition with openings 13 through which the cooling water passes from the lower part of the cooling jacket into its upper part. Then an upper plate 15 (Fig. 8) is put on from above, its openings 16 having exactly the same diameter as the openings 12 in the plate, 11 while the openings 17 are over the openings 13. This upper plate has moreover, four openings 18 for the insertion of the valve pieces. These valve-pieces or chambers (Fig. 9) consist of turned bodies 19 with three circular grooves 20. After the upper plate 15 has been welded together with the lower plate 11 to the cylinders, the turned bodies of the valve chambers 19 are inserted with their lower circular groove 20 in the openings 18 in the plate 15 and welded therein. Then the bottom of the connecting channels is made by means of plates 21, which, as shown in Fig. 10 are provided in their sides with upward bends 23, and, at the narrow end, with an upward bend 22, while their curved surfaces 24 fit into the central circular grooves 20 of the valve-box bodies and against the circumference of the corresponding cylinder 1. After inserting and welding the plates 21 the two cylinder-covers 25 are inserted, each of them being shaped as shown in Fig. 11. At the center a connecting passage 26 is provided for the compression cock carrying an offset stud 27.

In addition, in each cylinder-cover a slot 28 is cut to receive the lug 8 on the cylinder 1. The cylinder cover is now welded in place, as also is an internal sustaining rib 51 (Figs. 4 and 5) to the cylinder 1, and also, to the upper edge of the upward bends 22 and 23 of the channel portions 21. Then the cylinders 1 provided with the valve-boxes and connecting channels are connected to the jacket or casing 31 (Fig. 12), which may be advantageously made of one single piece of sheet iron which, as shown in Fig. 17, is cut into or slit as far as the part common to the circumference of the upper and lower sustaining plates 15 and 11, and by welding together the vertical end edges 34 and 35, when the parts are bent together, which parts are of different width, the form of the jacket box 31 (Fig. 12) is obtained which can be pushed upward from below in the axial direction of the cylinders over the bottom plate 9 and around the plates 11 and 15. As shown in Figs. 12 and 17, a slot 33 is provided at the center of the jacket, which slot engages, after the jacket has been pushed upward, with the projection 14 on the lower sustaining plate 11 (Fig. 7). This jacket being very thin and elastic it is possible to push the jacket 31, the ends of which have already been bent and welded together, past the projection 14 which need only as regards height be equal to the thickness of the sheet, but is shown in the drawing for the sake of clearness, on an exaggerated scale. After the jacket 31 has been pushed on it is welded to the bottom plate 9 and to the two plates 11 and 15, and also to the projection 14. The sheet forming the cooling jacket 31 is moreover provided with an opening 36 to provide a passage for the inlet pipe 47 for cooling water (Figs. 2-4). Then the bottom flange 37, which is provided with openings 38 to receive the bottom edges of cylinders 1 and with passages 39 for the securing bolts or screws, is put on from below and welded to the ribs 2 of the two cylinders. Then the inlet and outlet connecting branches 45 for the valve boxes, are welded on the inlet branch 45', being common to the two central adjacent valve-boxes, and having the form shown in Fig. 15, the internal closure against the cooling jacket chamber being effected by means of a bar 53 formed by welding together the ends. The two outlet branches 45 are separate for each exhaust valve, and shaped as shown in Fig. 15.

After the connecting branches 45 and 45' have been welded on the valve-boxes and cooling jacket the connecting flange 46 (Fig. 16) is welded to the connecting branches and, in addition, the inlet branch 47 for cooling water, inserted in the opening 36 of the cooling jacket is connected to the latter by autogenous welding. The cylinder jacket which has so far remained open at the top is now closed by a covering plate 40 (Fig. 14). This has in addition to the four openings in which the valve boxes 19 fit with their grooves 20, two further openings 43, which fit over studs 27 of the central connecting passages 26 of the cylinder covers 25, and also slots 42 which fit over the end-pins or lugs 6 of the cylinders (Fig. 5). In all these places, after the covering plate 40 has been put on, connection is effected by autogenous welding with the valve-boxes and cylinders the connection being also effected, around the circumference, with the cooling jacket box 31 in a similar manner. An outlet 48 for the cooling water is also inserted in the opening 54 in the covering plate 40, and connected by autogenous welding to the said covering plate. The valve stem guides 49 are next inserted and welded to the valve chambers, the valve stems 50, carrying the valves, are inserted in their guides 49, and the stop openings in the valve-boxes 19, provided for the insertion of the valves, are closed by screw-caps 52 (Fig. 2). The cylinder is now complete.

If the valves are arranged, in a different manner from that shown in Figs. 1 to 4, that is with the valves arranged on both sides of the cylinders instead of on one side only, no alterations are necessary in the essential features of the autogenously welded cylinder itself, the chief alteration required being in the form of some of the parts forming the valve chambers and water jacket. The necessary modifications are shown in Figs. 18 to 23. Each cylinder 1$^a$ (Fig. 18), has instead of the single projection 7 shown in Fig. 5, two projections 7$^a$, each having a lug or pin 8$^a$. The upper supporting plate 15$^a$ receives, instead of the form shown in Fig. 8, the form shown in Fig. 20, while the lower supporting plate 11$^a$ retains its original form, merely being provided with two projections 14$^a$ on the narrow edges instead of one projection on the long edge. Similarly each cylinder cover 25$^a$ has, in place of the form shown in Fig. 11, the form shown in Fig. 22, with two slots 28$^a$ for the two lugs or pins 8$^a$ of the cylinder 1$^a$; and the plates 21$^a$ receive, instead of the form shown in Fig. 10, that of Fig. 21 with the circular portions 24$^a$ adapted to the corresponding portions of the cylinder and valve box adjacent thereto. The valve boxes themselves retain the form shown in Fig. 9. The covering plate 40$^a$ of the upper part of the cooling jacket receives in conformity with the form of the upper supporting plate 15$^a$ the form shown in Fig. 23 with slots 42$^a$ for the lugs or pins 6$^a$ on the cylinders and with the openings 43$^a$ for the projections 26$^a$ of the cylinder covers 25$^a$ as shown. The opening for the water outlet passage can in this case be provided at the center of the cover plate at 54ᵃ. The development of the cooling jacket of this construction has not been specially shown in the drawing, since it will be easily understood. The lower portion remains the same as in Fig. 17, while the top portion becomes correspondingly wider and is bent in conformity with the contour of the upper supporting plate 15ᵃ and the upper cover plate 40ᵃ. When the water cooling jacket is slipped on over the cylinder 1ᵃ the central slot 33 engages with one lug or pin 14ᵃ of the lower supporting plate 11ᵃ, while below the welded edge 34 a second slot is cut out corresponding to the slot 33 which engages with the other lug or pin 14ᵃ. The advantages for explosion motors or internal combustion engines of a cylinder and water jacket built up entirely from separate sections welded together autogenously as described above, compared with ordinary cast cylinders are set out in the following statement.

Losses due to faulty casting are avoided and the reduction of weight is very considerable. By means of the ribs and the lugs or pins formed on the two supporting plates or between the cylinders, cylinder covers and cover plate of the cooling jacket a very firm connection is obtained between the parts. In the case of multi-cylinder engines the volume of the clearance spaces above the pistons is perfectly equal in all the cylinders, while this is extremely difficult to achieve with cast cylinders so that in the latter case on account of the different clearance volumes compression is not uniform in all the cylinders while with the cylinder as described in the present application this object is attained. A further considerable advantage is the perfect cooling of the cylinder-heads, valve-boxes and connecting passages, with the result that the consumption of cooling water is remarkably small. Finally the cost of manufacture is very appreciably reduced as compared with cast cylinders.

The mode of construction represented is merely an example and several modifications are possible within the scope of the invention. For instance a possible modification would be to make the lower plate and cover plate of the connecting passage between the valve-box and cylinder in one piece with the valve-box, or the side walls of the connecting passages could be formed by bent portions of the cylinders and valve-boxes and which parts could be autogenously welded to the cover and bottom of the passage formed to the valve-box. Further the cooling jacket instead of being formed from one single sheet, could be formed of two separate pieces of sheet-iron for the upper and lower portions and by autogenous welding connected to the cover plate and upper supporting plate and to the lower supporting plate and bottom-plate of the cylinders respectively. These constructions as represented by the suggested modifications are, however, less advantageous than those hereinbefore described.

For larger cylinders it would be advantageous to alter the form, shown in Fig. 9, of the turned bodies of the valve-boxes in such a way that the portion below the valve-seat and central circular groove 20, to which the inlet and outlet connecting passages 45 and 45′ are connected is made to taper from the top to the bottom, so that the diameter of the openings 18 in the upper supporting plate 15 is reduced. Further, the lower cylinder flange 37 (Figs. 4 and 13) need not be welded on, but it would be preferable with cylinders of large diameter for reasons of economy, to form the joint cold in the usual way by means of pipe expanders, by widening the ends of the cylinders.

What I do claim as my invention, and desire to secure by Letters Patent of the United States, is:—

1. A water-cooled cylinder structure for internal combustion engines or the like, having a working cylinder and valve boxes formed by turned bodies, supporting plates autogenously welded to the bottom of said bodies and to the working cylinder, for attaching said bodies to the latter, a water jacket autogenously welded to the said working cylinder and said supporting plates, whereby the latter divide the water jacket space into two compartments, the lower compartment surrounding the working cylinder, the upper compartment surrounding the cylinder head and said valve boxes, wall sections autogenously welded to said jacket, said valve boxes and said working cylinder, said sections forming the inlet and outlet passages to and from said valve boxes.

2. A water-cooled cylinder structure for internal combustion engines or the like having a working cylinder and valve boxes formed by turned bodies, supporting plates autogenously welded to the bottom of said bodies and to the working cylinder, for attaching said bodies to the latter, a water jacket comprising one piece of sheet metal which with said supporting plates forms two compartments of different diameter, said plates having lugs and said jacket having corresponding slots to engage with each other when the jacket is in place and being welded.

3. A water-cooled cylinder structure for internal combustion engines or the like, having a working cylinder and valve boxes formed by turned bodies, supporting plates autogenously welded to the bottom of said bodies and to the working cylinder, for attaching said bodies to the latter, a water jacket autogenously welded to the said working cylinder and said supporting plates, whereby the latter divide the water jacket space into two compartments, the lower compartment surrounding the working cylinder, the upper compartment surrounding the cylinder head and said valve boxes, wall sections autogenously welded to said jacket, said valve boxes and said working cylinder, said sections forming the inlet and outlet passages to and from said valve boxes, said wall sections consisting of sheet metal suitably shaped and having their lateral edges bent up to form the side walls of said passages, and a cylinder cover plate autogenously welded to said cylinder and to said bent-up edges, forming the top plate of said working cylinder and said passages.

4. A water-cooled cylinder structure for internal combustion engines or the like having a working cylinder, a sheet metal water jacket autogenously welded thereto and a cover for closing at the top the compartment formed by said water jacket, said cover having slots adapted to engage lugs provided on said cylinder and adapted to be welded to said cylinder, a cover for said working cylinder having slots adapted to engage lugs provided for it on said cylinder and adapted to be welded to said cylinder, and a spacing member disposed between and welded to said cylinder and wall jacket cover.

In testimony whereof I have hereunto set my hand in presence of two subscribing witnesses.

ERNST JAENISCH.

Witnesses:
WOLDEMAR HAUPT,
HENRY HASPER.